(No Model.)
J. CHILDS.
APPARATUS FOR THE MANUFACTURE OF AERATED BREAD OR CAKES.
No. 526,377. Patented Sept. 25, 1894.
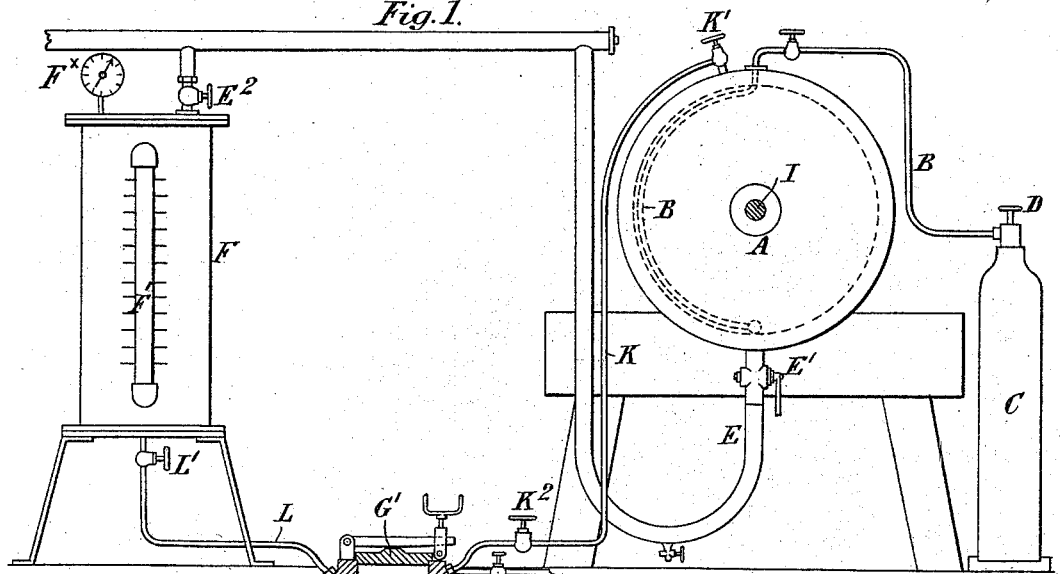
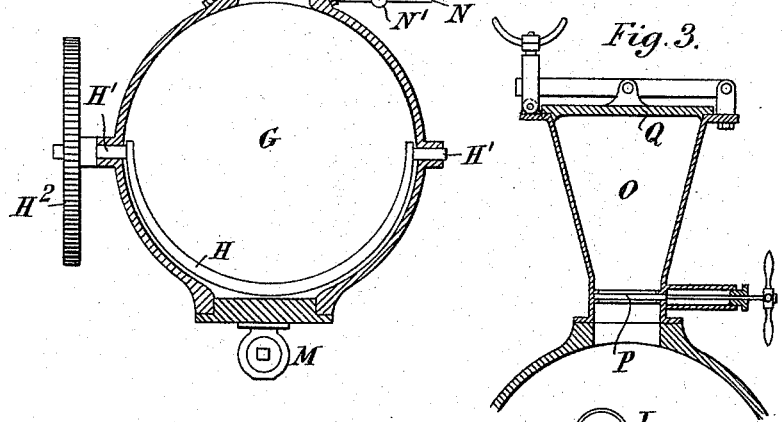
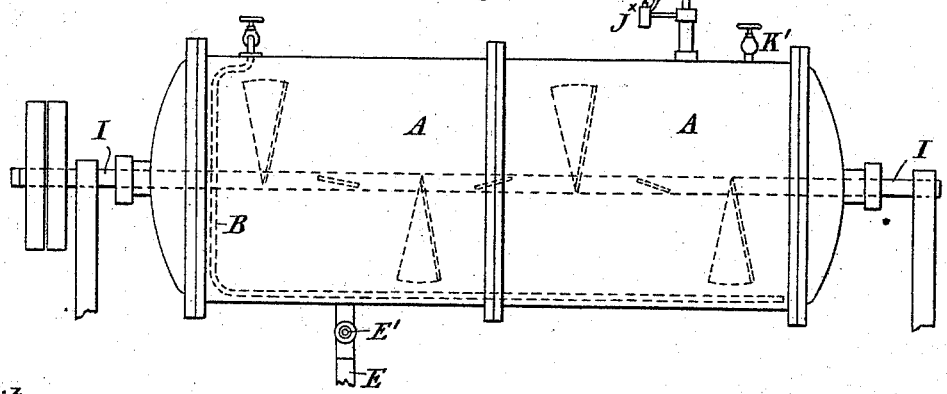
Witnesses
B. W. Miller
Guy E. Davis
Inventor
James Childs,
By his Attorneys
Baldwin Davidson & Wight

United States Patent Office.

JAMES CHILDS, OF LONDON, ENGLAND.

APPARATUS FOR THE MANUFACTURE OF AERATED BREAD OR CAKES.

SPECIFICATION forming part of Letters Patent No. 526,377, dated September 25, 1894.

Application filed June 2, 1894. Serial No. 513,263. (No model.)

*To all whom it may concern:*

Be it known that I, JAMES CHILDS, gentleman, a subject of the Queen of Great Britain, residing at Heathcroft, Putney Hill, London, in the county of Surrey, England, have invented certain new and useful Improvements in Apparatus for the Manufacture of Aerated Bread or Cakes, of which the following is a specification.

In the process of making aerated bread as heretofore carried out a mixing vessel in which flour has to be mixed with aerated water or other liquid is put in connection with a vessel containing a supply of the liquid used. Air is first expelled from the mixing vessel by filling it with carbonic acid, allowing the air to escape through an opening at the top and then closing this opening. Carbonic acid gas is also pumped into the vessel containing the liquid to be aerated, all gas not absorbed by the liquid passing on to the interior of the mixing vessel and the pumping is continued until the pressure in the two vessels has been raised to the required degree. When this has taken place the liquid now aerated by the gas which it has absorbed is allowed to flow down into the mixing vessel and is mixed with the flour which that vessel contains. The aeration of the liquid in the above way is not so complete as is desirable and practicable and in addition considerable plant is required for manufacturing the carbonic acid gas and for pumping the gas into the vessels containing the liquid to be aerated so rendering this way of making bread and the like unsuitable except for large establishments.

The object of my invention is to provide apparatus which can not only be used in small establishments but by which also the manufacture of bread and the like is greatly improved.

In the manufacture of bread, cakes, and the like from dough prepared with aerated liquid it is of great importance that the liquid with which the flour and other ingredients are admixed should not only be thoroughly aerated but that it should be aerated with pure carbonic acid gas unadmixed with any atmospheric air in order that when the dough is taken from the mixing vessel and relieved from pressure it may not only rise sufficiently but also gradually and uniformly whereas if atmospheric air be admixed with the carbonic acid the giving off of gas takes place much too rapidly for the dough to rise into a uniform minutely divided spongy mass.

To insure that the carbonic acid gas employed shall not be admixed with atmospheric air I cause the liquid to be aerated with carbonic acid from bottles containing this gas in a liquid state and to insure the thorough aeration of the liquid with the gas I construct the apparatus in such a way that the liquid before being admixed with flour, &c., shall be kept agitated for a considerable time in an aerating vessel.

The aeration may be effected either by rocking the vessel or by a revolving agitator. The vessel may either be the vessel in which the amount of liquid required for each charge of dough is measured before being admitted to the dough mixing vessel or it may be an aerating vessel of much greater size than is required for containing this quantity of liquid. When a large aerating vessel is used I also provide a measuring vessel into which the requisite quantity of aerated liquid to be delivered into the dough mixing vessel for each charge can be drawn off from the large aerating vessel and from which the liquid can be passed to the dough mixing vessel without loss of gas.

The large aerating vessel I preferably fit with a shaft passing into its interior and having blades projecting from it inside the vessel to agitate the liquid, while outside the vessel I provide for giving to the shaft a continuous revolving motion. I also provide for keeping this vessel constantly supplied with gas under pressure from bottles containing liquid carbonic acid, the admission of gas from the bottles to the vessel being controlled by a small stop valve so that an approximately constant pressure of gas may be maintained within the vessel. In this way the liquid may be kept agitated for a long time even for hours in presence of gas under pressure before being used for mixing with the flour.

The more perfect the aeration of the liquid the more perfectly will the dough formed with it pass into a minutely divided spongy state.

By using bottles containing liquid carbonic acid the amount of plant required for an establishment for making bread or cakes or the like is much reduced and can be used by any baker without the assistance of a skilled engineer.

All the pressure requisite for aerating the liquid used and for expelling the aerated dough from the mixing vessel into the molds can be obtained from the pressure upon the gas within the bottles.

To avoid waste of gas when a fresh charge of flour or material is to be placed into the dough mixing vessel the charge of flour or material may be first placed into a vessel which is separated by a valve from the dough mixing vessel and then when the vessel into which the flour has been placed has been closed the valve may be opened and the flour, &c., allowed to drop down into the dough mixing vessel or if this arrangement be not adopted the gas under pressure in the dough mixing vessel may be allowed to flow off into a bag or receiver before the dough mixing vessel is open for a fresh charge of flour or material to be fed it.

The power requisite for revolving the mixer of the mixing vessel and the agitator of the aerating vessel can be obtained from a small gas engine or otherwise or hand power may be used.

Figure 1 of the drawings annexed shows an elevation of apparatus arranged according to my invention. Fig. 2 is a side elevation of the aerating vessel used. Fig. 3 shows a modified arrangement for supplying flour or other ingredients into the mixing vessel.

A is the aerating vessel; B, a pipe extending to the bottom of the interior of this vessel from a bottle C containing liquid carbonic acid; D, a tap for controlling the passing off of gas from the bottle through the pipe B; E, a pipe passing from the bottom of the vessel A to a measuring vessel F; F', a gage glass fitted to the measuring vessel.

$F^{\times}$ is a pressure gage.

G is a mixing vessel in which measured quantities of aerated liquid are mixed with flour and other ingredients for making bread, cakes and the like; H, a mixing blade on axes H' and revolved within the mixing vessel; $H^2$, a toothed wheel on one of the axes for revolving the blade.

The water or liquid to be aerated is run into the aerating vessel A from an elevated cistern or is forced into it by a force pump.

A shaft I which passes through the aerating vessel and has agitating blades standing out from it is then made to revolve and carbonic acid is passed into the vessel from the bottle C by opening the taps D until the pressure in the aerating vessel has risen to the extent required. The pressure in the vessel is indicated by a pressure gage J. (See Fig. 2.) The liquid is kept agitated in this way in presence of carbonic acid under pressure for a considerable time previous to its being used.

$J^{\times}$ is a safety valve.

When a charge of dough is to be mixed the requisite quantity of flour and other ingredients is placed into the mixing vessel through the door G'. The air in this vessel is then expelled by the admission into it of carbonic acid through a pipe K from the upper part of the vessel A by opening the taps K' $K^2$. The door G' is then closed and more carbonic acid is admitted to the mixing vessel and from it to the measuring vessel until the pressure in these vessels is nearly but not quite up to the pressure in the aerating vessel.

The tap L' on the pipe L which connects the bottom of the measuring vessel with the mixing vessel is then closed and also the taps K' $K^2$ on the pipe K. Afterward the taps E' $E^2$ on the pipe E are opened and aerated liquid allowed to pass into the measuring vessel from the aerating vessel.

When the measuring vessel contains the required quantity of aerated liquid the tap $E^2$ is closed and the tap L' is opened. The aerated liquid then flows down from the measuring vessel into the mixing vessel—the slight excess of pressure in the measuring vessel helping it to do so. The tap L' is now closed and the mixing blade is kept revolving within the mixing vessel until the dough is thoroughly mixed. When this has been done the dough is drawn off into molds in the ordinary manner through the tap M.

When all the dough has been drawn off from the mixing vessel carbonic acid may be allowed to pass off from this vessel through a pipe N by opening a tap N' upon it.

When the pressure of gas in the vessel has in this way been reduced the door G' may be opened and a fresh charge of flour and ingredients placed into the vessel and the operation repeated. The carbonic acid allowed to pass away by the pipe N may either be allowed to escape into the air and be wasted or it may pass into an elastic bag or other form of gasometer and be pumped from thence back into the aerating vessel.

In place of the charge of flour and other ingredients being introduced into the mixing vessel through a door G' as above described it may as has before been proposed by me be first placed into a smaller vessel O which as shown in Fig. 3 is shut off from the mixing vessel by a valve P. Before introducing the charge into the mixing vessel the smaller vessel O is closed at the top by a cover Q. The valve P is then opened and the charge allowed to drop into the mixing vessel which may already have had a charge of aerated liquid introduced into it.

What I claim is—

1. The combination of a mixing vessel in which flour and other ingredients can be mixed with aerated liquid, an aerating vessel for aerating liquid a bottle containing liquid carbonic acid a pipe connecting the bottle with such aerating vessel—a valve for regulating the passage of gas through this pipe a measuring vessel for measuring the requisite quantity of aerated liquid to be mixed with each charge of flour or other ingredient put into the mixing vessel and passages fitted with valves between the aerating vessel and the measuring vessel and between the measuring vessel and the mixing vessel substantially as described.

2. The combination of a mixing vessel in which flour and other ingredients can be mixed with aerated liquid—an aerating vessel for aerating liquid—a measuring vessel for measuring the requisite quantity of aerated liquid to be mixed with each charge of flour or other ingredient put into the mixing vessel and passages fitted with valves between the aerating vessel and the measuring vessel and between the measuring vessel and the mixing vessel substantially as described.

3. The combination of a mixing vessel in which flour and other ingredients can be mixed with aerated liquid—an aerating vessel for aerating liquid—a bottle containing liquid carbonic acid—a pipe connecting the bottle with such aerating vessel a valve for regulating the passage of gas through the pipe and passages with valves upon them connecting the mixing vessel with the upper and lower parts of the aerating vessel substantially as described.

JAMES CHILDS.

Witnesses:
JOHN H. WHITEHEAD,
T. F. BARNES.